Figure 1:
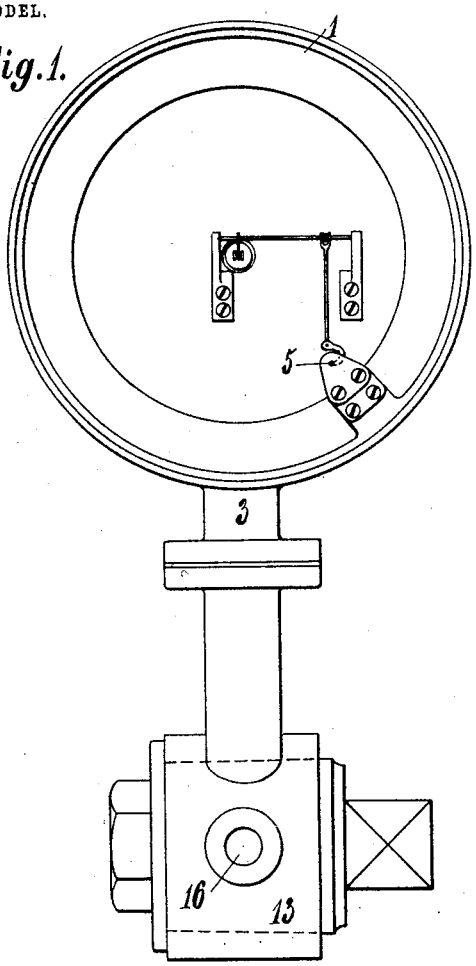

No. 755,175. PATENTED MAR. 22, 1904.
G. M. SCHUBERT.
DIFFERENTIAL HIGH AND LOW PRESSURE GAGE.
APPLICATION FILED JAN. 22, 1903.
NO MODEL. 2 SHEETS—SHEET 1.

Witnesses.
H. Mori
L. Waldman

Inventor.
Georg Max Schubert
by B. Singer
Att'y

No. 755,175. PATENTED MAR. 22, 1904.
G. M. SCHUBERT.
DIFFERENTIAL HIGH AND LOW PRESSURE GAGE.
APPLICATION FILED JAN. 22, 1903.
NO MODEL. 2 SHEETS—SHEET 2.

Witnesses.
H. Mori.
L. Waldman.

Inventor.
Georg Max Schubert
by B. Singer.
Att'y.

No. 755,175. Patented March 22, 1904.

UNITED STATES PATENT OFFICE.

GEORG MAX SCHUBERT, OF CHEMNITZ, GERMANY.

DIFFERENTIAL HIGH AND LOW PRESSURE GAGE.

SPECIFICATION forming part of Letters Patent No. 755,175, dated March 22, 1904.

Application filed January 22, 1903. Serial No. 140,134. (No model.)

*To all whom it may concern:*

Be it known that I, GEORG MAX SCHUBERT, a subject of the German Emperor, and a resident of Chemnitz, in the Kingdom of Saxony and Empire of Germany, have invented certain new and useful Improvements in Differential High and Low Pressure Gages, of which the following is a specification.

This invention relates to improvements in draft-pressure gages particularly for use with furnaces.

The draft-pressure gages hitherto used do not indicate the actual quantity of air which passes through the furnace, but only indicate the relative static pressure at the point measured as compared to the atmospheric pressure. It is thus conceivable that with considerable underpressure indicated above the fire-bars a comparatively small quantity of air will pass through the grate—as, for instance, if fuel is piled so high that little or no atmospheric air can penetrate through the layer of coal. On the other hand, when the furnace-door is wide open the underpressure indicated is less, whereas the greatest possible quantity of air is then passing over the fire-bars to the boiler-flues.

The present invention relates to a draft-pressure gage—that is to say, to a device which in the first place allows of measuring the actual difference of pressure in the furnace-flues, but which also allows of measuring, if necessary, the pressure above the fire-bars or in front of the uptake-damper as compared to the atmospheric pressure.

The main feature of the new instrument is that the axle of the pointer is adapted to be operated by the usual means employed with overpressure and underpressure gages by the static pressure at one point and by that at another point, the said pressures acting simultaneously or separately. For this purpose it is, for instance, sufficient to couple to each other the pointer-axles of two pressure-gages of the same system and provided with equal scales, one of the said gages being connected by a tube to one of the chambers or the like in question and the other pressure-gage being connected to the other chamber or the like. Two forms of construction will hereinafter be described which are particularly adapted to measure the pressure difference and which have over the arrangement indicated above the advantages of requiring only one case.

Figure 2:
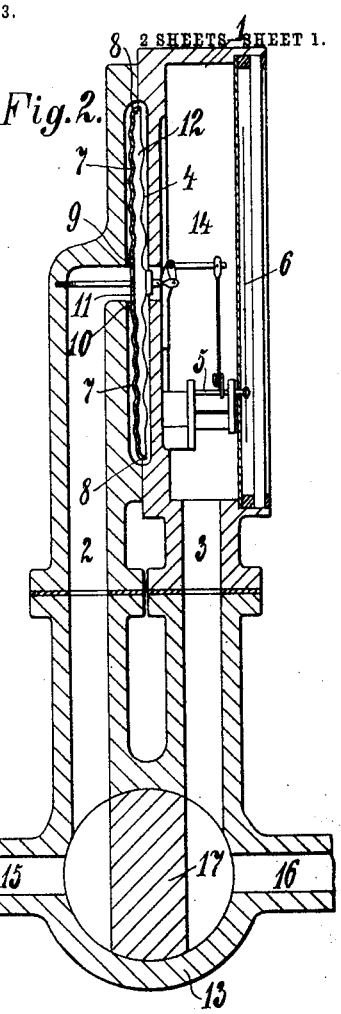
Figure 6:
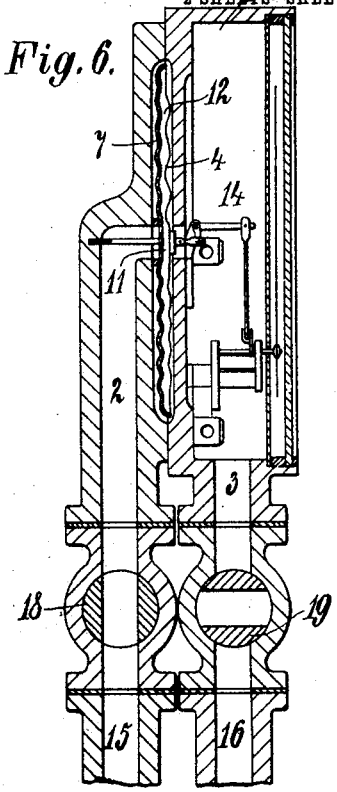
Figure 7:
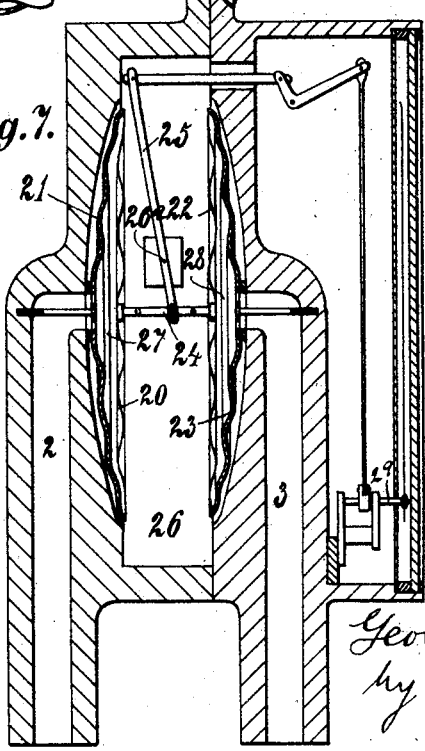

These two forms of construction are illustrated in Figures 1, 2, and 7 of the annexed drawings. Figs. 3 to 6 illustrate means for making and breaking communication between the two chambers or the like in which the pressure is to be measured.

As shown in Figs. 1 and 2, the first form of construction comprises a vacuum-meter 1 of known construction, in which the under pressure to be measured by the draft-pressure gage acts through the tube 2 on the plate-spring 4, the movement of which is transmitted by a suitable train of levers to the axle 5 of the pointer 6, Fig. 1. The plate-spring membrane 4 is soldered at 8 to the supporting-plate 7, which is fixed at 9 to the wall 10, so that the said plate 7 and the plate-spring form the walls of a hollow space 12, which communicates by means of the annular aperture 11 with the channel 2. The novel feature of the instrument consists in the fact that not only the hollow space 12 is connected by a pipe to a chamber or the like in which the pressure is to be measured, but that the space on the other side of the membrane 4 is also adapted to be connected by a channel 3 to a similar chamber or the like. By this means the relative condition of static pressure can be ascertained—that is to say, the difference of pressure between them can be measured.

If it is desired, for instance, to ascertain the difference between the pressure in the space above the fire-bars and that in the flue in front of the uptake-damper, it is only necessary to connect the tube 3 to the first-named space and the tube 2 to the flue. If, on the other hand, only the static pressure above the fire-bars or in front of the uptake-damper is desired, the tube 2 or 3, as the case may be, is closed, and by this means communication between the chamber 12 or 14 and the respective place is interrupted. For this purpose the channels 2 and 3 can be connected to a four-way cock 13, as shown in Figs. 1 and 2. When the plug 17 of the said cock is in the position shown in Fig. 2, the channel 2 and tube 15 and channel 3 and tube 16, respectively, are in communication with each other. In this case the difference of pressure between the two chambers will be indicated.

Figure 3:
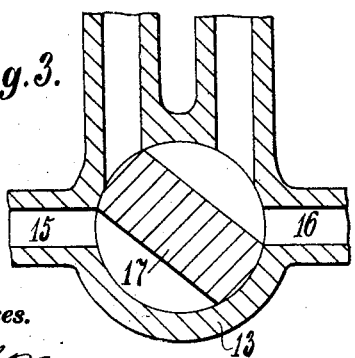
Figure 4:
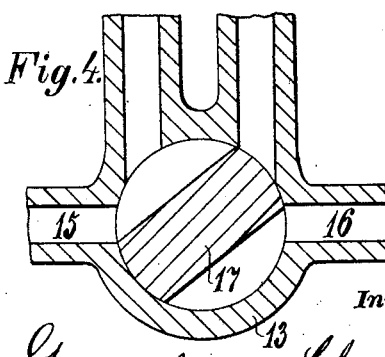

In Fig. 3 the plug 17 is shown in the position in which communication between the tube 15 and channel 2 is interrupted, while that between 16 and 3 is open. In Fig. 4 the position is reversed. With the cock in the position shown in Fig. 3, therefore, only the relative static pressure above the fire-bars as compared to that of the outer atmosphere is indicated.

Of course any other equivalent device can be used for the purpose indicated instead of the four-way cock 13—for instance, a fork with two passage-cocks or a suitable arrangement of valves.

Figure 5:
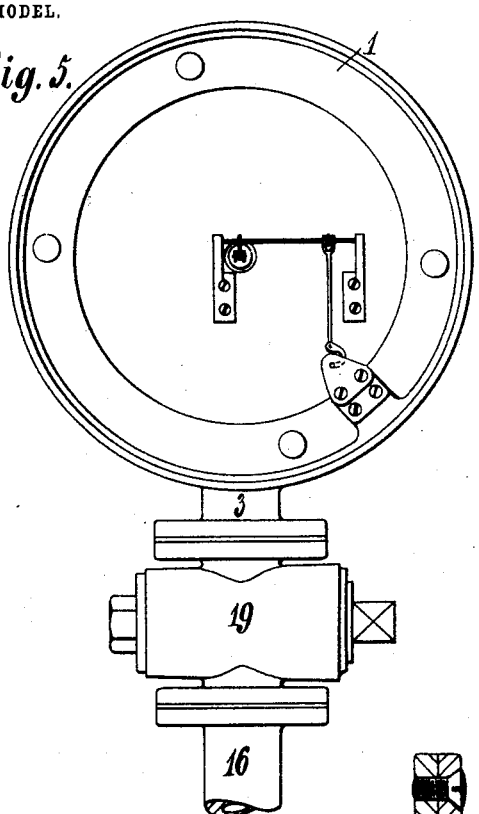

In the arrangement shown in Figs. 5 and 6 two ordinary cocks 18 and 19 are provided in place of the four-way cock 13. This arrangement is very simple. With the cocks in the position shown in Fig. 6—that is to say, the cock 19 closed and the cock 18 open—only the difference of pressure between the space in front of the uptake-damper and the outer atmosphere will be measured. To measure the actual difference of pressure between the two spaces referred to above, the cock 19 must also be opened.

In the form of construction shown in Figs. 1 and 2 the operating mechanism of the pressure-gage is contained in a chamber in which a partial vacuum exists. It is not impossible that external disturbances in the air will cause ash, soot, and the like borne by the air-current to enter the said chamber. To prevent this, two membrane-springs are preferably provided instead of one, the said springs being so arranged that one spring is operated by the draft-conduit of the one place and the other spring by the draft-conduit of the other place. This form of construction is shown in Fig. 7 and comprises two membrane-springs 20 22, arranged in a case 26. With supporting-plates 21 and 23, respectively, the said springs form the closed chambers 27 and 28. The latter are adapted to communicate by means of channels 2 and 3, respectively, with the spaces in front of the uptake-damper and above the fire-bars. The draft in front of the uptake will tend to cause the spring 20 to move toward the plate 23. The springs, which are coupled to each other by the part 24, are thus actuated in opposite directions, so that in this case also only the difference of pressure will be transmitted to the lever 25, pivoted at $26^a$, or by other known means to the pointer-axle 29.

Having now fully described my invention, I declare that what I claim is—

In a differential draft-pressure gage for measuring the difference of pressure between two points the combination of two membranes arranged in a case said membranes having supporting-plates and forming with the latter hollow chambers, channels leading into the said hollow chambers and means for placing the latter in communication with the chambers or the like in which the pressure is to be measured, substantially as set forth.

In testimony whereof I affix my signature in presence of two witnesses.

GEORG MAX SCHUBERT.

Witnesses:
MORRIS LIPMAN,
FREDERICK J. DIETZMAN.